United States Patent
Takada et al.

(10) Patent No.: US 7,572,349 B2
(45) Date of Patent: Aug. 11, 2009

(54) OPTICAL DEVICE AND PRODUCTION METHOD THEREFOR

(75) Inventors: Motoo Takada, Saitama (JP); Ryoichi Koseki, Saitama (JP); Kazuya Takahashi, Saitama (JP); Yoshimitsu Iizuka, Saitama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 0 days.

(21) Appl. No.: 12/156,826

(22) Filed: Jun. 5, 2008

(65) Prior Publication Data
US 2008/0245473 A1 Oct. 9, 2008

Related U.S. Application Data

(62) Division of application No. 10/889,290, filed on Jul. 12, 2004, now Pat. No. 7,399,512.

(30) Foreign Application Priority Data
Jul. 15, 2003 (JP) ............................. 2003-274567

(51) Int. Cl.
*B32B 37/00* (2006.01)
(52) U.S. Cl. .................. 156/264; 156/256; 156/295
(58) Field of Classification Search ................ 156/250, 156/256, 264, 295; 359/577, 580; 428/68; 348/335, 342
See application file for complete search history.

(56) References Cited

U.S. PATENT DOCUMENTS

| | | | |
|---|---|---|---|
| 3,457,022 A | 7/1969 | Fields | |
| 4,283,194 A | 8/1981 | Teague et al. | |
| 4,342,565 A | 8/1982 | Teague et al. | |
| 5,812,226 A * | 9/1998 | Izumi et al. | 349/73 |
| 6,147,732 A | 11/2000 | Aoyama et al. | |
| 6,204,906 B1 | 3/2001 | Tannas, Jr. | |
| 6,459,462 B1 | 10/2002 | Seraphim et al. | |
| 7,006,286 B2 * | 2/2006 | Satake et al. | 359/491 |
| 2003/0133254 A1 | 7/2003 | Chen | |

FOREIGN PATENT DOCUMENTS

| | | |
|---|---|---|
| EP | 1 097 184 | 3/2002 |
| SU | 1775522 | 11/1992 |

* cited by examiner

*Primary Examiner*—James Sells
(74) *Attorney, Agent, or Firm*—Scott D. Wofsy; Edwards Angell Palmer & Dodge LLP

(57) ABSTRACT

An optical device, such as an optical low-pass filter, and a production method therefor, which prevents damage, and thus maintains optical characteristics are provided. The optical device includes a plurality of optical plates joined together with adhesive. The adhesive is spread to extend to the peripheral edge of the optical plates and to the outer periphery of the principal plane surrounding the plurality of optical plates, thus forming a protective coating.

6 Claims, 4 Drawing Sheets

OPTICAL DEVICE AND PRODUCTION METHOD THEREFOR

CROSS-REFERENCE TO RELATED APPLICATIONS

This application is a divisional application of U.S. patent application Ser. No. 10/889,290, filed Jul. 12, 2004 now U.S. Pat. 7,399,512, which in-turn claims priority to Japanese Patent Application No. 2003-274567, filed Jul. 15, 2003. Each of the foregoing applications is incorporated herein by reference in its entirety.

BACKGROUND OF THE INVENTION

The present invention relates to an optical device and a production method therefor. In particular, it relates for example to an optical low-pass filter and a production method therefor, which prevents damage during transportation, while increasing productivity and yield.

Optical low-pass filters are built into various electronic equipment incorporating optical systems, being located in front of the imager in optical devices such as cameras, and are used to prevent color blur by utilizing their birefringence. In recent years, electronic equipment with built in optical systems are becoming increasingly common, thus increasing their demand. It is therefore desired to prevent damage so that optical characteristics can be maintained with certainty, and also to prevent negative effects on other optical devices.

FIG. 4 to FIG. 6 illustrate a conventional production example of an optical low-pass filter.

As shown in FIG. 5, an optical low-pass filter 1 comprises a laminate where a plurality of, for example three, optical plates 1a, 1b, 1c, made up from optical plates of chip-form glass or crystal made into a veneer, are bonded together and laminated by an adhesive. For this adhesive, for example an ultraviolet curing adhesive may be used.

Usually in a conventional production method for an optical low pass filter, firstly as shown in FIG. 4, a laminated wafer is obtained by bonding together and laminating a plurality of optical wafers (composed of glass or crystal) with adhesive, and then dividing this into individual laminates by cutting with a dicing saw.

Next, the laminates (optical low-pass filters 1) are manually lined up one by one in a washing device and washed and dried, and then inspected visually. Lastly, as shown in FIG. 5, one face (bottom face) of the optical low-pass filter 1 is affixed to the surface of a double sided adhesive tape 3 which is also affixed to a mount 2 inside a packing box, and the optical low-pass filter 1 is then stored and shipped in a fixed, inverted position. As a result, damage to the optical low-pass filter 1 due to vibrations and shocks during transportation, and coming into contact with other equipment is prevented.

However, in the conventional production method for an optical low-pass filter as described above, a problem is that the optical low-pass filters (optical plates) 1 consisting of laminates, must be manually aligned in the washing device one-by-one by an operator. A further problem is that, as shown in FIG. 5, to individually invert the optical low-pass filters (optical plate) 1 onto the mount 2 is extremely inefficient so that productivity and yield is low.

Taking into account these problems, mass automation of the washing and packing of optical low-pass filters 1 has been devised. However, since the optical low-pass filter 1 is composed of brittle material (for example, glass and crystal), there is a fear of causing damage (such as chipping) to the periphery thereof, particularly in the production process when it comes into contact with automated equipment. Moreover, when the optical low-pass filters 1 are packed, then as shown in FIG. 6, a packing box 4 with small gutters, has these small gutters in bottomed crevices 5 formed in the packing box 4, and each optical low-pass filter 1 is attached for example by the principal plane of the optical low-pass filter 1, into the crevice 5 by automatic transfer from the previous process. However, even in this case, the optical low-pass filter 1 becomes damaged by colliding with the inner walls of the crevice 5 due to vibrations during transportation. Such damage causes minute debris produced by the damage to adhere to the midsection of the principal plane of the optical low-pass filter, causing deterioration of optical characteristics.

In particular, the optical low-pass filter 1 of the construction described above, is normally formed by dividing a laminated optical wafer (laminated wafer) by a dicing saw. In this case particularly the cutting plane (cleavage plane) of the laminated wafer can have minute and sharp protrusions (burrs), and be jagged. Consequently, these protrusions tend to form minute debris by becoming detached from the cutting plane due to shock and vibration. Moreover, such minute debris can cause negative effects on other electronic devices built into electronic equipment.

Here, the optical device is described as a laminated optical low-pass filter, but the same problems generally arise in optical devices including a wave plates comprising veneers.

SUMMARY OF THE INVENTION

An object of the present invention is to provide an optical device and a production method therefor, which can prevent damage during transportation, and thus maintain optical characteristics.

An optical device of the present invention has adhesive effused and spread on the side faces of a plurality of optical plates. Furthermore, the adhesive is effused and spread so as to span from the side faces surrounding the plurality of optical plates to the outer periphery of the two principal planes.

In addition, the present invention is a production method for an optical device involving: spreading an adhesive between the principal planes of the plurality of optical plates which form the optical device; pressing the plurality of optical plates from both principal planes to effuse the adhesive from between the principal planes; effusing and spreading the adhesive onto the side face surrounding the optical plate; and effusing and spreading the adhesive so as to span from the side face surrounding the optical plate to the outer periphery of the two principal planes.

In the optical device of the present invention, the adhesive which is effused and spread on the side faces surrounding the plurality of optical plates also functions as a protective material, amply preventing damage to the optical plates during transportation. Furthermore, in the production method for an optical device of the present invention, the adhesive is effused and spread spanning to the periphery surrounding the optical plates and to the periphery of the principal planes, enabling efficient automatic processes to be executed.

DETAILED DESCRIPTION OF THE PREFERRED EMBODIMENTS

An optical device of the present invention comprises, for example, an optical low-pass filter 1 composed of laminates formed by sticking together for example three optical plates (glass, crystal) 1a, 1b, 1c, being veneers, with a suitable adhesive.

Figure 1:
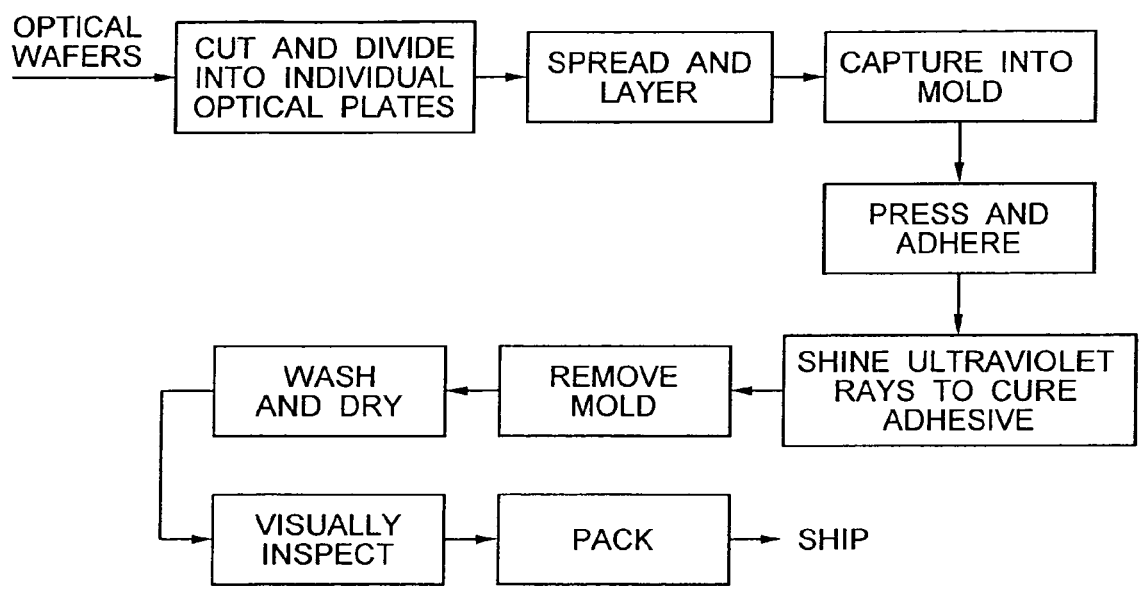
FIG. 1 is a flow chart of an example of a production method for an optical device such as an optical low-pass filter, of the present invention.
Figure 2:
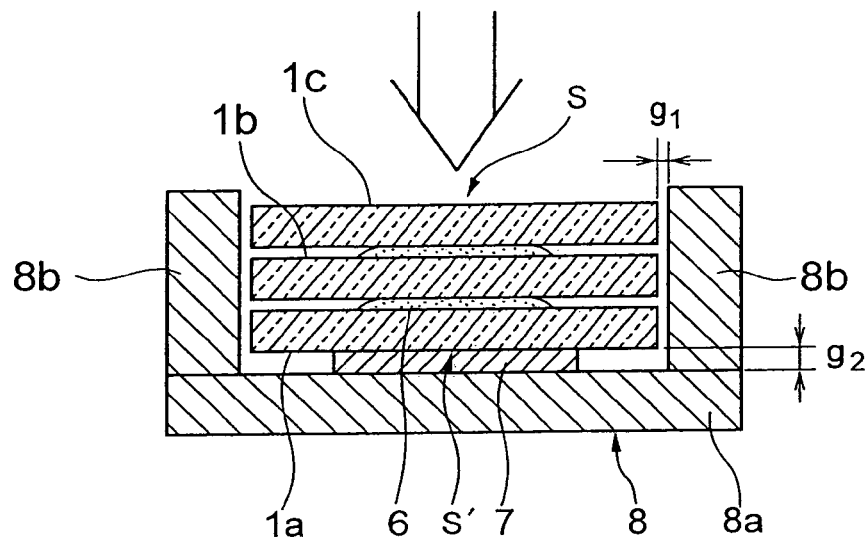
FIG. 2 is a longitudinal section of an apparatus used in the example of the production method for an optical device (optical low-pass filter) of the present invention, for capturing and press bonding three optical plates in a mold.
Figure 3:
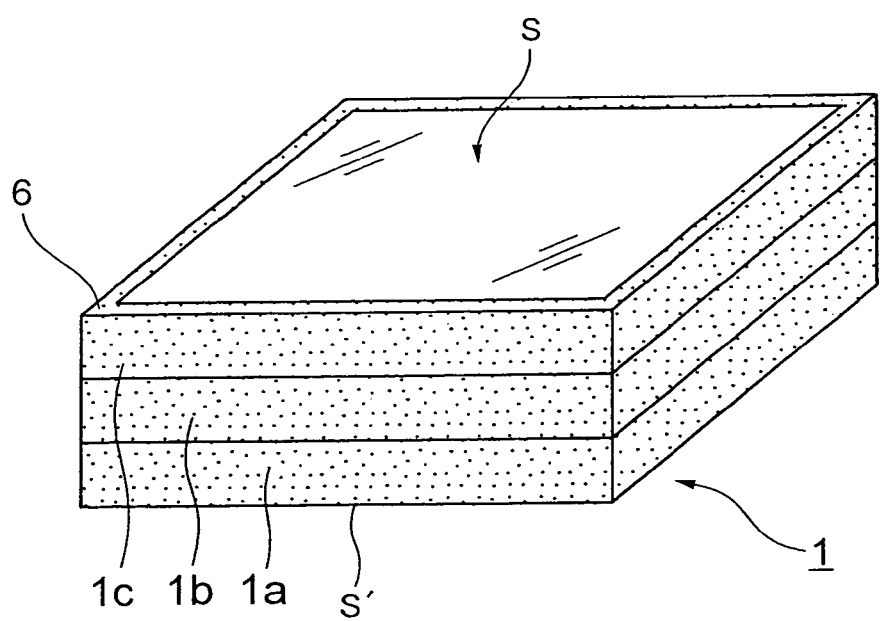
FIG. 3 is a perspective view of the optical device (optical low-pass filter) of the present invention.
Figure 4:
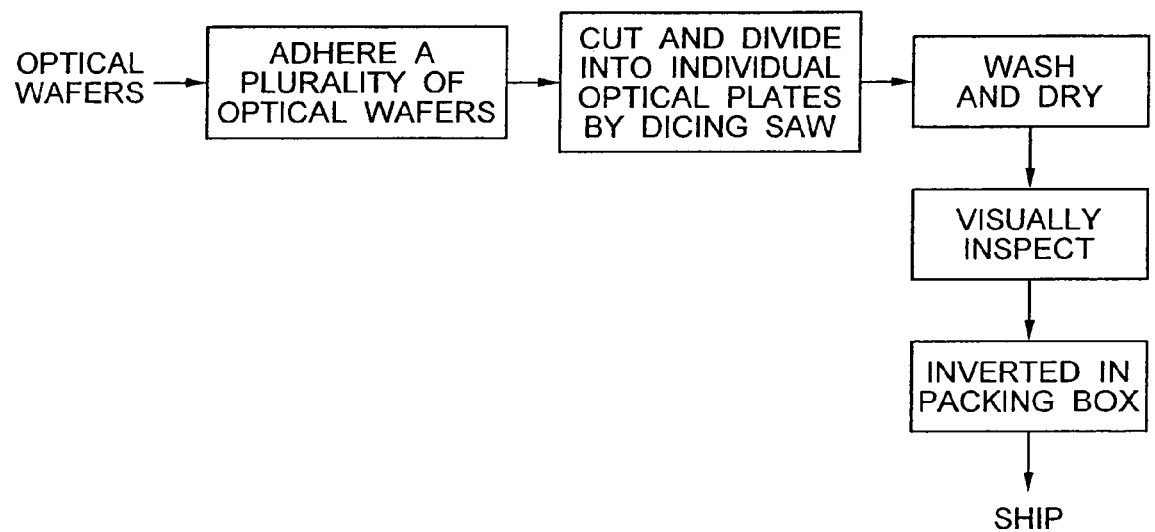
FIG. 4 is a flow chart of a conventional production method for an optical low-pass filter.
Figure 5:
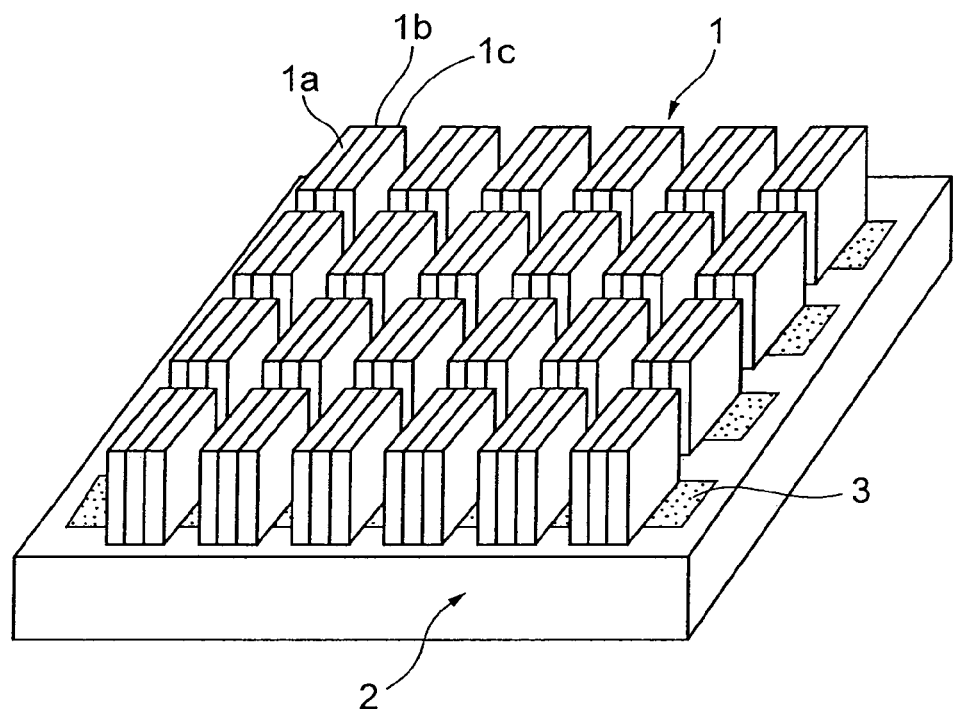
FIG. 5 is a perspective view showing a state after production of conventional optical low-pass filters, with the filters stored inverted on a base of a packing box.
Figure 6:
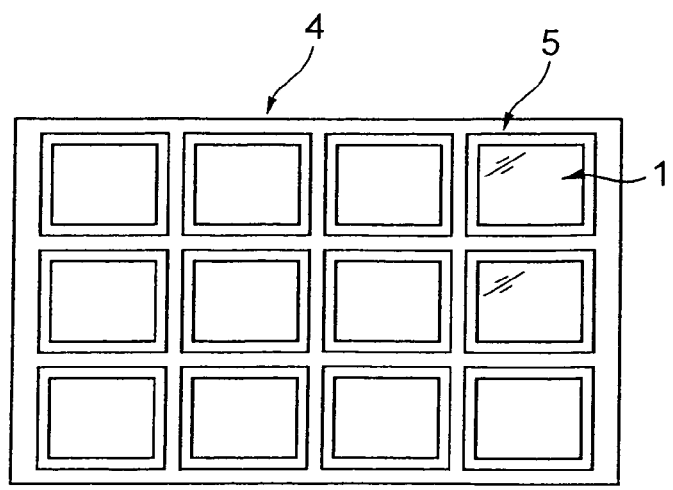
FIG. 6 is a top view of another example of after production of conventional optical low-pass filters with the filters stored in a packing box.

Here, to produce the optical device (optical low-pass filter) 1, each of the three optical wafers made of veneer are firstly cut and divided using the dicing saw mentioned above into individual optical plates 1a, 1b, 1c, as shown in FIG. 1 and FIG. 2. Next, adhesive 6 is spread onto the first optical plate 1a, and the second optical plate 1b is layered on top. Then adhesive 6 is spread onto the second optical plate 1b, and the third optical plate 1c is layered on top. These optical plates 1a, 1b, 1c are then subjected to bonding and laminating by capturing so as to leave gaps $g_1$, $g_2$ inside a mold 8 which can be assembled and disassembled, being made up of four pushing plates having walls (frame walls) which move in four directions, and having on an inside bottom face thereof a protuberance 7 of square or circular section serving as a holding section. For the mold 8, the planar shape may be C-shape with the frame wall on one side being movable.

Next, the three optical plates 1a, 1b, 1c layered inside the mold 8 are pressed from the upper surface with a predetermined pressure. That is, the optical plates 1a, 1b, 1c are pressed between both principal planes S and S' so that the adhesive 6 overflows out to the side faces surrounding the optical plates 1a, 1b, 1c. In this case, the gaps $g_1$ and $g_2$ between the mold 8 and the optical plates are filled with adhesive 6 such that the adhesive 6 circulates to outside both principal planes (upper and lower surface) of the three optical plates 1a, 1b, 1c. In this state, the adhesive 6 is cured by shining ultraviolet rays to form a thin protective coat (for example, of thickness about 20 microns). Lastly, the mold is opened in four directions and removed.

Accordingly, an optical low-pass filter can be obtained which has adhesive spread out to the side faces surrounding the optical plates 1a, 1b, 1c. The adhesive may be exuded and spread in minute thickness (for example, of about 20 microns) over the periphery (top and bottom face periphery) of the principal planes of both the upper and lower optical plates 1a and 1c.

According to such a construction, the adhesive 6 which spans the side face and periphery of the upper an lower principal planes surrounding the optical plates 1a, 1b, 1c of the optical low-pass filter 1 of the present invention, particularly covers and protects each ridge line of the optical plates 1a, 1b, 1c. Especially, in this example, since the optical plates 1a, 1b, 1c are divided by a dicing saw, the resulting sharp protrusions (burrs) on the outside faces of the optical plates are coated and protected.

Accordingly, even if there are collisions and contact at the time of vibrations and shocks during transportation of the optical low-pass filter 1, damage of the outer peripheral side faces having protrusions or burrs can be sufficiently prevented. Therefore, minute debris due to damage is not produced, and minute debris cannot adhere to the principal planes of the optical low-pass filter, allowing the optical characteristics to be well maintained.

Furthermore, when the principal planes of the optical low-pass filters 1 have been attached by vacuum and contained inside the crevices in the transfer tray or packing box, contact with other transfer apparatus (automated equipment) cannot cause damage. Therefore, the washing and packing processes of the optical low-pass filter 1 can be automated, resulting in an increase in productivity. Moreover, the adhesive 6 which bonds the optical plates 1a, 1b, 1c is effused from the surroundings of the optical plates 1a, 1b, 1c, and spread on the sides and the outer upper and lower faces of the optical plates 1a, 1b, 1c. Therefore, the bonding of the optical plates 1a, 1b, 1c and the spreading process for the protection agent can be performed in a single process. Furthermore, the burrs, unevenness and irregularities on the side faces when the numerous optical plates cut by the dicing saw are layered together can also be flattened by spreading the adhesive.

In this example of the present invention described above, the adhesive was effused and spread on the side faces and the outer periphery of the upper principal plane surrounding the optical plate. However, even if the adhesive is only effused and spread on the outer side faces, the ridge lines of the four side faces and the four corners which are contacted for example by the fingers of the automated equipment used in production, are amply protected by the adhesive. Furthermore, the adhesive 6 was stated as being an ultraviolet curing material. However, it may also be a thermosetting material. Alternatively, thin tape form material may be used instead of adhesive to strap the side faces of the optical plates to form a protective film.

Moreover, the optical device in the present invention was explained as a laminated optical low-pass filter 1. However this may be applied to an optical device comprising, for example, a veneer of a wave plate containing an optical low-pass filter, or an optical device other than a laminated-optical low-pass filter.

Furthermore, the optical low-pass filter (laminate) 1 was formed by cutting three optical wafers into individual optical plates 1a, 1b, 1c, and then bonding them together, but it is possible to also bond together three optical wafers and then divide them to obtain a laminate. In this case, the laminate can be protected from damage by, at the very least, spreading adhesive over the outer side faces of the optical plates.

Moreover, the cutting and division of the optical wafers was done by a dicing saw, but similarly, a scriber can be used to first make a cutting groove and the division then performed. Even in this situation, burrs can occur on the outer side faces due to the scriber. Furthermore the laminate can be formed by mirror polishing the optical plates and then joining them, rather than using adhesive.

What is claimed is:

1. A production method for an optical device having upper and lower principal planes, wherein a plurality of optical plates are bonded together and laminated by an adhesive, the method comprising the steps of:

cutting and dividing an optical wafer into a plurality of optical plates, each plate having two principal planes;

spreading an adhesive on at least one principal plane of at least one of said plurality of optical plates;

arranging at least two optical plates in a stack, such that adhesive spread in the spreading step is arranged between adjacent principal planes of the at least two optical plates;

pressing the stack of optical plates from both principal planes to overflow said adhesive from between said adjacent principal planes; and effusing and spreading said adhesive onto an outer peripheral side face of the stack and into a peripheral region of each of the upper and lower principal planes of the stack, wherein the adhesive between the principal planes of adjacent plates is continuous with the coating of adhesive on the outer peripheral side face of the stack and with the coating of adhesive on the peripheral region of each of the upper and lower principal planes of the stack.

2. A production method for an optical device according to claim 1, wherein said adhesive is overflowed spanning from the side face surrounding said optical plate to the outer periphery of the upper and lower principal planes of the optical device.

3. A production method for an optical device according to claim 1, wherein said adhesive is an ultraviolet curable material.

4. A production method for an optical device according to claim 1, wherein said adhesive is a thermosetting material.

5. A production method for an optical device according to claim 4, wherein said optical device is an optical low-pass filter.

6. A production method for an optical device according to claim 1, wherein said adhesive covers the entire peripheral side face of said stack.

* * * * *